(12) United States Patent  
Yoshioka et al.

(10) Patent No.: US 11,183,723 B2  
(45) Date of Patent: Nov. 23, 2021

(54) CAP FOR BATTERY CASE AND BATTERY

(71) Applicant: Maxell Holdings, LTD., Kyoto (JP)

(72) Inventors: Masanobu Yoshioka, Kyoto (JP); Yoshihisa Fujihara, Kyoto (JP)

(73) Assignee: Maxell Holdings, Ltd., Kyoto (JP)

( * ) Notice: Subject to any disclaimer, the term of this patent is extended or adjusted under 35 U.S.C. 154(b) by 242 days.

(21) Appl. No.: 16/521,625

(22) Filed: Jul. 25, 2019

(65) Prior Publication Data

US 2020/0035963 A1    Jan. 30, 2020

(30) Foreign Application Priority Data

Jul. 30, 2018    (JP) .............................. JP2018-142831

(51) Int. Cl.
| | | |
|---|---|---|
| *H01M 2/04* | (2006.01) | |
| *H01M 2/06* | (2006.01) | |
| *H01M 50/147* | (2021.01) | |
| *H01M 50/172* | (2021.01) | |

(52) U.S. Cl.  
CPC ....... *H01M 50/147* (2021.01); *H01M 50/172* (2021.01)

(58) Field of Classification Search  
CPC ............ H01M 50/147; H01M 50/172; H01M 50/155; H01M 50/543; H01M 50/15; H01M 50/169; H01M 2220/30; Y02E 60/10

See application file for complete search history.

(56) References Cited

U.S. PATENT DOCUMENTS

| | | | | |
|---|---|---|---|---|
| 6,573,000 | B1 * | 6/2003 | Miyazaki ............ | H01M 50/166 429/185 |
| 2009/0061306 | A1 * | 3/2009 | Uh ....................... | H01M 50/147 429/174 |
| 2016/0293908 | A1 * | 10/2016 | Lee ...................... | H01M 50/543 |

FOREIGN PATENT DOCUMENTS

JP    4278222 B2    6/2009

* cited by examiner

*Primary Examiner* — Muhammad S Siddiquee  
(74) *Attorney, Agent, or Firm* — Renner, Otto, Boisselle & Sklar, LLP

(57) ABSTRACT

A cap for closing an opening of a battery case for containing an electrode assembly is formed by an elongated plate extending in a longitudinal direction. The cap includes: a terminal hole for allowing a negative electrode terminal of the electrode assembly to pass therethrough; a recess formed in an outer surface of the cap, the outer surface representing the exterior of the battery, the recess located in a region that surrounds the terminal hole and that is not in contact with the outer periphery of the outer surface. An edge of the recess includes a projection protruding inwardly. The projection is positioned to overlap the terminal hole as determined along the longitudinal direction.

6 Claims, 5 Drawing Sheets

CAP FOR BATTERY CASE AND BATTERY

CROSS-REFERENCE TO RELATED APPLICATION

This application is based upon and claims the benefit of priority of the prior Japanese Patent Application No. 2018-142831, filed on Jul. 30, 2018, the entire contents of which are incorporated herein by reference.

BACKGROUND

Technical Field

The present invention relates to a cap for a battery case and a battery.

Description of the Background Art

Batteries for portable terminals such as smartphones and tablets include thin sealed batteries. In such a sealed battery, a battery case contains an electrode assembly having a positive electrode and a negative electrode for the battery. The battery case has a bottomed cylindrical shape having an opening. The opening of the battery case is closed by a cap. The cap is welded to the battery case using a laser, for example.

Japanese Patent No. 4278222 discloses a seal plate to be fitted into the opening of the exterior can of a sealed battery and sealed by laser welding. The surface of this seal plate includes a stepped portion extending along the outer periphery.

SUMMARY

The inventors conducted research into the construction of a cap for closing an opening of a battery case containing a pair of electrodes. The cap includes a terminal hole for allowing the negative or positive electrode terminal to pass therethrough. The inventors further considered arrangements where a recess is provided on the outer surface of the cap to surround the terminal hole. The inventors found that the shape of the recess affects the airtightness of the terminal hole and the tendency to release heat in the cap during welding.

A cap for a battery case according to an embodiment of the present invention is a cap adapted to close an opening of a battery case for containing an electrode assembly. The cap is formed by an elongated plate extending in a longitudinal direction. The cap includes a terminal hole adapted to allow a positive electrode terminal or a negative electrode terminal of the electrode assembly to pass therethrough. The cap includes a recess formed in an outer surface of the cap, the outer surface representing an exterior of the battery, the recess located in a region that surrounds the terminal hole and that is not in contact with an outer periphery of the outer surface. An edge of the recess includes a projection protruding inwardly. The projection is positioned to overlap the terminal hole as determined along the longitudinal direction.

The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

EMBODIMENTS

Figure 1:
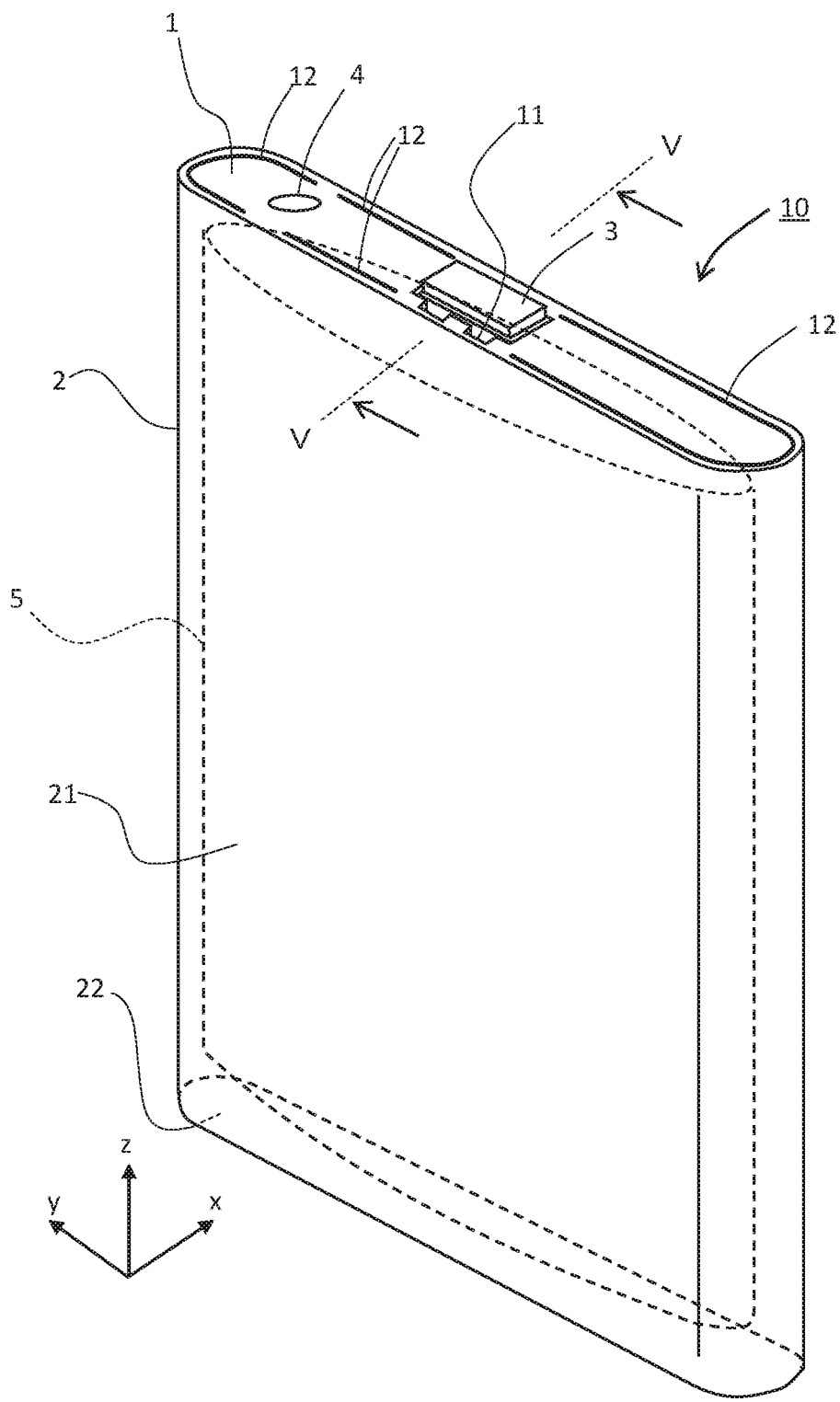
FIG. 1 is a schematic perspective view of a battery according to an embodiment.

The above-described conventional technique involves forming a groove in the surface of the seal plate so as to extend along its outer periphery. The groove extends along the entire periphery. In a thin battery, the seal plate, i.e. cap, has a small lateral dimension. As such, if a groove is present along the entire periphery of the cap, it is difficult to position a negative electrode terminal in the cap. In view of this, the present inventors considered arrangements in which no groove is present near the negative electrode terminal. In such arrangements, during welding, heat can be easily released from the portions where no groove is present. Thus, provided the welding conditions are the same, the portions without a groove tend to have lower welding strengths than the portions with a groove. The portions with low welding strengths can present initiation points for cracks.

Arrangement 1

A cap for a battery case according to an embodiment of the present invention is a cap adapted to close an opening of a battery case for containing an electrode assembly. The cap is formed by an elongated plate extending in a longitudinal direction. The cap includes: a terminal hole adapted to allow a positive electrode terminal or a negative electrode terminal of the electrode assembly to pass therethrough; a recess formed in an outer surface of the cap, the outer surface representing an exterior of the battery, the recess located in a region that surrounds the terminal hole and that is not in contact with an outer periphery of the outer surface; and a groove located in a region that does not overlap the recess as determined along the longitudinal direction of the cap, the groove being spaced apart from the outer periphery and extending along the outer periphery.

In Arrangement 1, the recess surrounds the terminal hole of the cap and the groove is positioned to keep away from the recess as determined along the longitudinal direction. The groove is provided along the outer periphery without intruding between the recess and outer periphery. The combination of such a recess and a groove will reduce the area with weak welding while ensuring that there is a location at which a positive or negative electrode terminal can be positioned. That is, the welding state can be made almost uniform while ensuring that there is a location for a positive or negative electrode terminal.

Arrangement 2

Starting from Arrangement 1, an edge of the recess may include a projection protruding inwardly, and the projection may be positioned to overlap the terminal hole as determined along the longitudinal direction. Due to the presence of the projection, the dimension of the recess as measured in the lateral direction at the terminal hole is smaller. Thus, when the positive or negative electrode terminal and the packing member are brought through the terminal hole and swaged, the projection prevents the packing member to escape in the lateral direction. The packing member is provided between the positive or negative electrode terminal and the terminal hole without leaving a gap. This will avoid a reduction in the sealability of the packing member while ensuring that there is a location for the positive or negative electrode terminal as determined along the longitudinal direction of the cap. The groove of the cap may be omitted. Even if the groove is omitted, the projection of the recess prevents the packing member from escaping in the lateral direction. This prevents the packing member from contacting a large portion of the outer periphery of the recess. This prevents welding heat from being transmitted to central portions of the cap. That is, the projection of the recess improves the airtightness of the cap and also prevents heat release during welding.

Arrangement 3

Starting from Arrangement 1 or 2, the cap may include a fill port, and the groove may be configured to be located in a region that does not overlap the fill port as determined along the longitudinal direction. In this arrangement, the groove and fill port do not interfere with each other, which facilitates manufacture of the cap.

Arrangement 4

A battery according to an embodiment includes: an electrode assembly having a positive electrode, a negative electrode, and a separator positioned between the positive electrode and the negative electrode; a battery case having a flat cylindrical side wall adapted to contain the electrode assembly and a bottom adapted to seal one of ends of the side wall as determined along an axial direction of the side wall; and a cap adapted to close an opening of the side wall, the opening located on an end of the side wall opposite to the end associated with the bottom. The cap is formed by an elongated plate extending in a longitudinal direction. The cap includes: a terminal hole adapted to allow the positive electrode terminal or the negative electrode terminal of the electrode assembly to pass therethrough; a recess formed in an outer surface of the cap, the outer surface representing an exterior of the battery, the recess located in a region that surrounds the terminal hole and that is not in contact with an outer periphery of the outer surface; and a groove located in a region that does not overlap the recess as determined along the longitudinal direction of the cap, the groove being spaced apart from the outer periphery and extending along the outer periphery. This arrangement will make the welding state almost uniform while ensuring that the cap of the battery case provides a location at which the positive or negative electrode terminal can be positioned. The battery may also include a packing member filling a gap between the positive or negative electrode terminal passing through the terminal hole and the terminal hole. An edge of the recess may include a projection protruding inwardly. The projection is positioned to overlap the terminal hole as determined along the longitudinal direction. In such cases, for example, the packing member may fill the gap so as to contact the projection. The groove of the cap may be omitted.

The cap is formed by an elongated plate extending in a longitudinal direction. Its lateral direction is the direction that is perpendicular to both the thickness direction and longitudinal direction of the plate forming the cap. The recess and groove not overlapping each other as determined along the longitudinal direction means the same as the recess and groove not overlapping each other as viewed in the lateral direction. The recess and terminal hole overlapping each other as determined along the longitudinal direction means the same as the recess and terminal hole overlapping each other as viewed in the lateral direction. The outer surface of the cap is that surface of the cap which is located outwardly with respect to the battery case when the cap closes the opening of the battery case. The recess is that portion of the cap whose outer surface is located lower, as determined along the thickness direction of the cap, than the outer surface of the outer periphery. That is, the thickness of the cap as measured at the recess is smaller than the thickness of the cap as measured at the outer periphery.

Starting from any one of Arrangements 1 to 4, a region of the outer surface of the cap closer to a center of the cap than the groove may be located at a height equal to that of a region between the outer periphery and the groove. This will make it easier to weld another member, such as an external connection terminal, to a portion of the outer surface of the cap closer to the center of the cap than the groove.

Starting from any one of Arrangements 1 to 4, a minimum distance between the recess and the outer periphery of the cap may be equal to or smaller than a minimum distance between the groove and the outer periphery of the cap. That is, compared with the groove, the recess may be positioned to be equally close, or even closer, to the outer periphery. This prevents heat release during welding in near-recess portions with no groove to the same degree as in portions with a groove. This makes the welding state yet more uniform. The minimum distance between the recess and outer periphery being equal to the minimum distance between the groove and outer periphery does not only mean that these distances are exactly equal, but can also mean that the difference between these distances is negligible such that they can be deemed to be equal for the purposes of heat-release prevention during welding.

Embodiments will now be described with reference to the drawings. The same and corresponding components in the drawings are labeled with the same characters, and the same description will not be repeated. For ease of understanding, in the drawings to which reference will be made below, some components are shown in a simplified or schematic manner, or some components are not shown.

Configuration of Battery

FIG. 1 is a schematic perspective view of a battery 10 according to an embodiment. The battery 10 is a so-called square battery. In the context of the present embodiment, for convenience of explanation, a rectangular coordinate system is defined having an x-direction defined as the direction perpendicular to the side surface of the battery 10 with the largest area, and a y-direction and a z-direction defined as the directions of two adjacent sides of that large side surface.

The battery 10 includes an electrode assembly 5, a battery case 2 for containing the battery assembly 5, and a cap 1 for closing an opening of the battery case 2. The battery case 2 also contains electrolyte (not shown). The battery case 2 includes a flat cylindrical side wall 21, a bottom 22 which seals one of the ends of the side wall 21 as determined along the axial direction, and the cap 1 which closes the other one of the ends of the side wall. In the present implementation, the battery case 2 is a can including a side wall 21 and bottom 22 that are formed in an integral manner. The present implementation describes, as an example, a battery 10 in which the battery case 2 and cap 1 are charged to form the positive electrode.

The side wall 21 is flat and cylindrical in shape. In the implementation shown in FIG. 1, the z-direction is the axial direction of the cylinder forming the side wall 21. The side wall 21 is composed of a pair of opposite wide-surface portions and a pair of opposite narrow-surface portions. The area of a wide-surface portion is larger than the area of a narrow-surface portion. A narrow-surface portion and a wide-surface portion are adjacent and contiguous to each other. The outer surface of a wide-surface portion is a flat surface, while the outer surface of a narrow-surface portion is a curved surface. The geometry of the side wall 21 is not limited to this particular implementation. For example, the side wall 21 may have the shape of a rectangular cylinder or an elliptic cylinder. That is, the side wall 21 may have a rectangular or elliptic cross section perpendicular to the axial direction of the side wall.

The cap 1 closes an opening of the battery case 2. Specifically, the cap 1 is fitted into an opening on that end of the flat cylindrical side wall 21 which is located opposite to the end associated with the bottom 22. The cap 1 is formed by an elongated plate extending in a longitudinal direction. In the implementation shown in FIG. 1, the y-direction is the longitudinal direction of the cap 1, and the x-direction is the lateral direction of the cap 1. In the battery 10, the outer surface of the cap 1 includes a recess 11. A negative electrode terminal 3 is to be positioned in the recess 11. The outer surface of the cap 1 includes a groove 12 extending along the outer periphery 1a of the outer surface.

The electrode assembly 5 includes a positive electrode, a negative electrode and a separator. The separator is disposed between the positive and negative electrodes. The positive electrode, negative electrode and separator are shaped as layers. When the electrode assembly 5 is contained in the battery case 2, the layer plane of each of the positive electrode, negative electrode and separator is generally perpendicular to the bottom 22.

Figure 2:
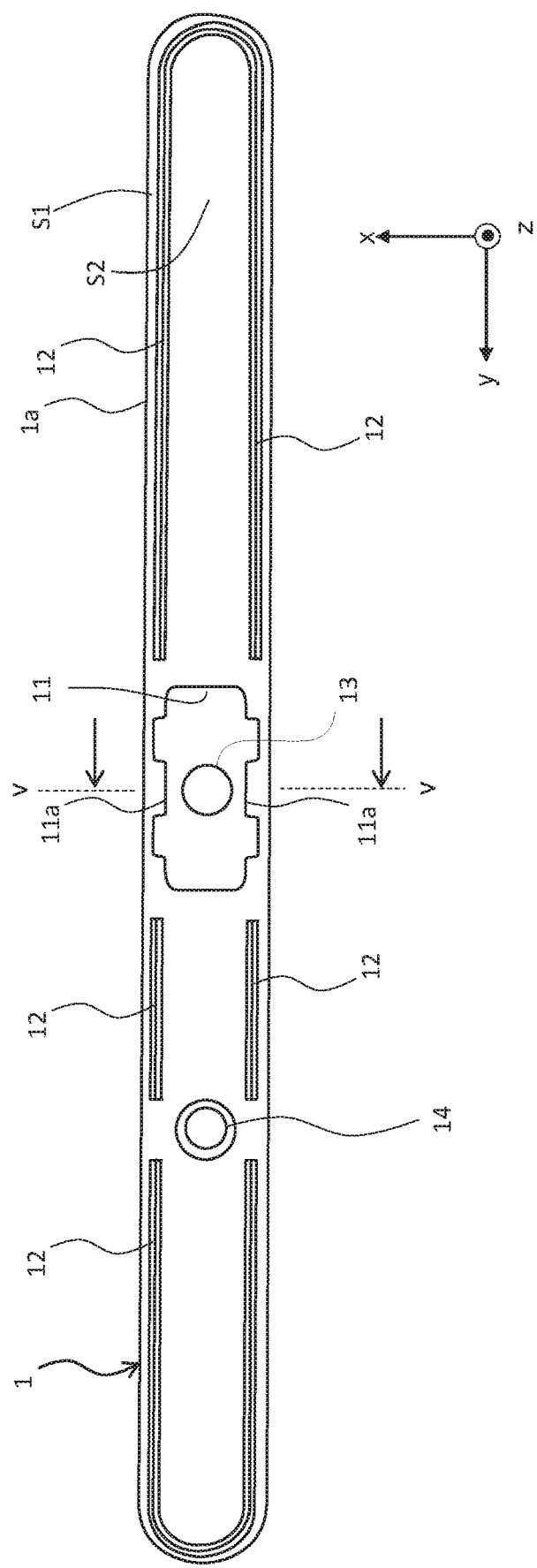
FIG. 2 is a top view of the outer surface of the cap as viewed in the z-direction.

FIG. 2 is a top view of the outer surface of the cap 1 as viewed in the z-direction. The cap 1 includes a terminal hole 13 for allowing the negative electrode terminal of the electrode assembly 5 to pass therethrough. The recess 11 is located in a region that surrounds the terminal hole 13 and that is not in contact with the outer periphery 1a of the outer surface. In other words, the recess 11 is provided on the outer surface of the cap 1 to surround the terminal hole 13. The recess 11 is not in contact with the outer periphery 1a of the outer surface. The surface of the recess 11 is depressed in the thickness direction of the cap 1, and is located lower than the surfaces of the cap portions that are in contact with the outer periphery 1a.

The groove 12 is located in a region that does not overlap the recess 11 as determined along the longitudinal direction of the cap 1. That is, the groove 12 does not overlap the recess 11 as viewed in the lateral direction. In other words, the groove 12 and the recess are located in different region as determined along the longitudinal direction. In yet other words, the groove 12 is located in a region different from the regions sandwiched between the recess 11 and outer periphery 1a as determined along the lateral direction of the cap 1. The groove 12 is spaced apart from the outer periphery 1a and extends along the outer periphery 1a. As determined along the longitudinal direction, the groove 12 extends along substantially all the portions of the outer periphery 1a which do not overlap the recess 11. For a given stretch, the groove 12 extends in the same direction as the closest portion of the outer periphery 1a. The distance between a given position of the groove 12 and the closest position of the outer periphery 1a is constant. The groove 12 is not limited to a particular cross-sectional shape, and may be V-shaped or U-shaped, for example. As determined along the directions of the outer periphery of the cap 1, the groove 12 is discontinuous. As determined along the directions of the outer periphery of the cap 1, a plurality of grooves 12 are provided that are spaced apart from each other. The ends of the grooves 12 are spaced apart from the recess 11.

The outer periphery 1a of the cap 1 is welded to the battery case 2. For example, a laser beam may be directed to the outer periphery 1a of the cap 1 and edges of the opening of the battery case 2, which are positioned in contact with the outer periphery 1a, to weld the cap 1 and battery case 2 together. In such implementations, during welding, the outer periphery 1a and nearby areas of the cap 1 are irradiated with a laser beam and melt. If a groove 12 is present near the outer periphery 1a, there is no path through which heat can be conveyed from the outer periphery 1a, which means that heat cannot easily be released. Thus, the outer periphery 1a and nearby cap portions can easily be melted by irradiation with a laser beam. On the contrary, if no groove 12 is present near the outer periphery 1a and the outer surface is flat, heat in the outer periphery 1a can easily escape. As such, in areas where the groove 12 is not present near the outer periphery 1a, the melt conditions of the outer periphery 1a and nearby cap portions are different from those for the portions having the groove 12, even if the laser beams directed to these two portion types have the same amount of energy. In the implementation shown in FIG. 2, the recess 11 is provided in a region in which the groove 12 is not present as determined along the longitudinal direction. Similar to the groove 12, the recess 11 prevents heat from being released form the outer periphery 1a. Thus, the welding state for the portions of the outer periphery 1a having the recess 11 nearby is not significantly different from the welding state for the portions of the outer periphery 1a having the groove 12 nearby. This results in an almost uniform welding state along the entire outer periphery 1a. For example, if the welding conditions are the same along the entire outer periphery, unevenness in welding state is unlikely to occur for the entire outer periphery.

In the implementation shown in FIG. 2, the cap 1 includes a fill port 14 for allowing electrolyte to flow therethrough. The fill port 14 is used during manufacture of the battery 10 to inject electrolyte (not shown) into the battery case 2. In the completed battery 10, the fill port 14 is sealed by a seal plug 4 (see FIG. 1). The groove 12 is located in a region that does not overlap the fill port 14 as determined along the longitudinal direction. That is, the fill port 14 is located in a region different from the region sandwiched by the fill port 14 and outer periphery 1a as determined along the lateral direction of the cap 1.

As a result, the groove 12 is disrupted near the fill port 14. For the purpose of achieving a uniform state of welding between the cap 1 and battery case 2, a disruption of the groove 12 is permissible if its impact on the welding state is negligible. In the implementation of FIG. 2, a disruption of the groove 12 near the fill port 14 is thought to hardly affect the welding state, because the grooves nearby cut off heat-release paths.

In the implementation shown in FIG. 2, the edges of the recess 11 include at least one projection 11a that protrudes inwardly. Each projection 11a is positioned to overlap the terminal hole 13 as determined along the longitudinal direction. That is, as viewed in the lateral direction, the projection 11a overlaps the terminal hole 13. As determined along the lateral direction, the projection 11a protrudes toward the terminal hole 13. In the implementation shown in FIG. 2, the recess 11 includes two projections 11a. As determined along the lateral direction, the terminal hole 13 is located between the two projections 11a. The projection 11a overlapping the terminal hole 13 as determined along the longitudinal direction means that at least part of the projection 11a overlaps the terminal hole 13 as determined along the longitudinal direction.

In the present implementation, those portions of the outer surface of the cap 1 which are closer to the center of the cap 1 than the groove 12, designated as region S2, may be at the same height as the portions located between the outer periphery 1a and groove 12, designated as region S1. That is, the surface of the region S2, located inward of the groove 12, may be at a height as determined along the thickness direction of the cap 1 (i.e. z-direction) that is equal to the height of the cap 1 as determined at the region S1 which is located outward of the groove 12. Thus, during welding of another member (e.g., positive electrode terminal), the welded portions within the region S2, located inward of the groove 12, are at the same height as the welded portions of the outer periphery 1a. This will make it easy to weld such another member to the region S2.

Figure 3:
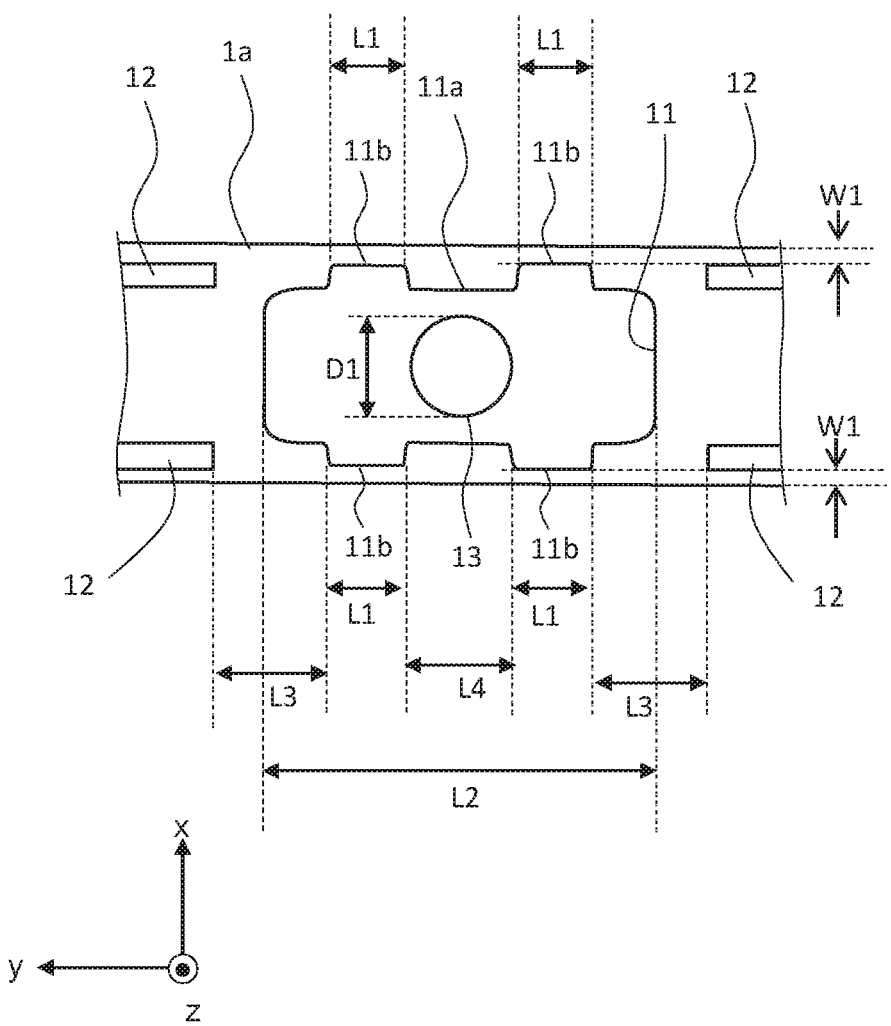
FIG. 3 is an enlarged view of the recess 11 and surrounding areas shown in FIG. 2.

FIG. 3 is an enlarged view of the recess 11 and surrounding areas shown in FIG. 2. The projection in the recess may overlap at least part of the groove as viewed in the longitudinal direction. In the implementation shown in FIG. 3, the minimum distance between the recess 11 and outer periphery 1a is equal to the minimum distance between the groove 12 and outer periphery 1a, both distances being denoted by W1. Thus, heat release during welding can be prevented in the portions of the outer periphery 1a near the recess 11 to the same degree as the portions of the outer periphery 1a near the groove 12. The minimum distance between the recess 11 and outer periphery 1a is represented by the distance between the portions of the recess 11 and outer periphery 1a which are located closest to each other, where this portion of the recess 11 is denoted by 11b. The minimum distance between the groove 12 and outer periphery 1a is represented by the distance between those portions of the groove 12 and outer periphery 1a which are located closest to each other.

The portion 11b of the recess 11, where the distance between the recess 11 and outer periphery 1a is at its minimum, continuously extends a length L1 as measured in the longitudinal direction. Two portions 11b of the recess 11 where that distance is at its minimum are present between ends of two grooves 12 arranged in the longitudinal direction. The projection 11a is located between these two portions 11b of the recess 11. Thus, the welding state for the portions of the outer periphery 1a and nearby cap portions between ends of the two grooves 12 can be similar to the welding state for the other portions of the outer periphery 1a and nearby cap portions.

In the implementation shown in FIG. 3, the shape defined by the edges of the recess 11 is linearly symmetrical with respect to an axis extending in the lateral direction. This will achieve a yet more uniform welding state.

The longitudinal distance between the two longitudinally arranged portions 11b of the recess 11, denoted by L4, and the distance between a portion 11b of the recess 11 and the end of the groove 12 which faces that portion in the longitudinal direction, denoted by L3, is preferably not larger than twice the diameter D1 of the terminal hole 13 ($L4 \leq 2 \times D1$, $L3 \leq 2 \times D1$), for example. The distance L4 is the same as the longitudinal dimension of the projection 11a. Each of the distances L4 and L3 is more preferably not larger than 1.5 times the diameter D1 of the terminal hole 13 ($L4 \leq 1.5 \times D1$, $L3 \leq 1.5 \times D1$). This will achieve a yet more uniform welding state for the outer periphery 1a and nearby cap portions. To facilitate positioning of the negative electrode terminal 3, the longitudinal dimension L2 of the recess 11 may be, for example, larger than the diameter D1 of the terminal hole 13 and not larger than four times the diameter D1 ($D1 \leq L2 \leq 4 \times D1$).

Figure 4:
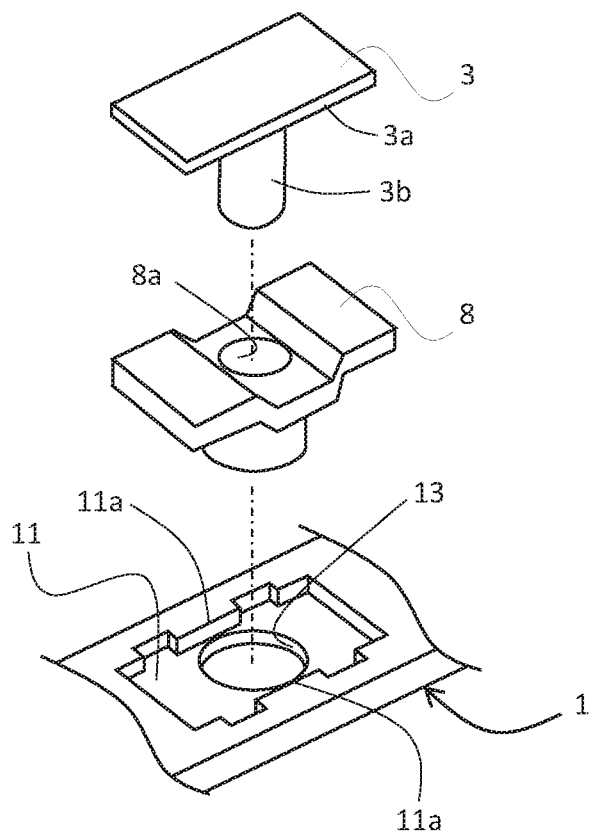
FIG. 4 is an exploded perspective view of the negative electrode terminal, packing member and cap.

FIG. 4 is an exploded perspective view of the negative electrode terminal 3, packing member 8 and cap 1. As shown in FIG. 4, the negative electrode terminal 3 and packing member 8 are inserted into the terminal hole 13 in the cap 1. With the negative electrode terminal 3 and packing member 8 positioned to extend through the terminal hole 13, they are swaged. Thus, the packing member 8 is embedded between the negative electrode terminal 3 and terminal hole 13 without leaving a gap. The packing member 8 seals the gap between the negative electrode terminal 3 and terminal hole 13. Specifically, the negative electrode terminal 3 includes a top portion 3a and a columnar portion 3b protruding and extending from the top portion 3a. With the columnar portion 3b of the negative electrode terminal 3 positioned to extend through a through-hole 8a of the packing member 8, the negative electrode terminal 3 and packing member 8 are brought through the terminal hole 13.

Figure 5:
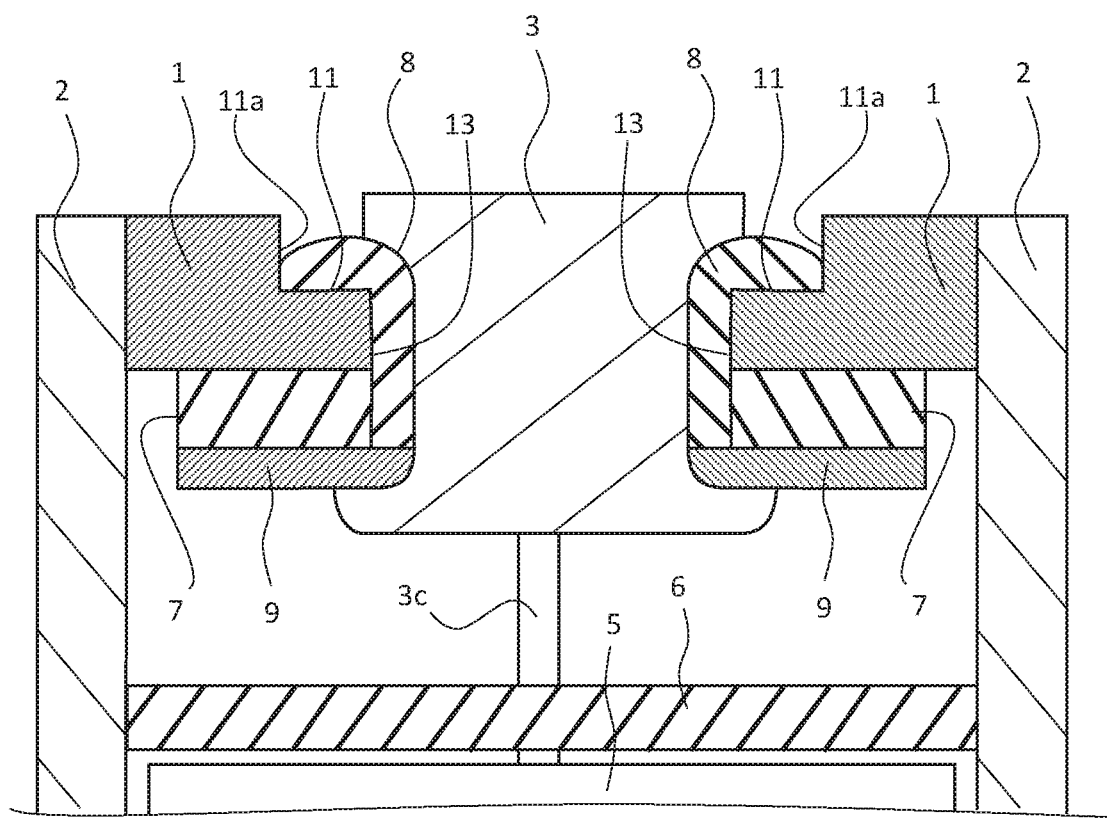
FIG. 5 is a cross-sectional view of the battery taken along line V-V shown in FIG. 1.

FIG. 5 is a cross-sectional view of the battery taken along line V-V shown in FIG. 1. As shown in FIG. 5, some portions of the packing member 8 and negative electrode terminal 3 are exposed to the outside of the battery case 2 through the cap 1. An insulating member 7 and a lead plate 9 are provided on the interior of the cap 1. The lead plate 9 is an electric conductor. The insulating member 7 is located between the cap 1 and lead plate 9. Each of the insulating member 7 and lead plate 9 has a hole positioned to overlap the terminal hole 13 of the cap 1. The packing member 8 and negative electrode terminal 3 extend through the cap 1, insulating member 7 and lead plate 9. The negative electrode terminal 3 is in contact with the lead plate 9. The packing member 8 and insulating member 7 insulate the negative electrode terminal 3 from the cap 1. The packing member 8 may be formed from polypropylene, for example. The negative electrode terminal 3 may be formed from stainless steel, for example.

A negative electrode lead 3c is connected to the lead plate 9. The negative electrode lead 3c is connected to the negative electrode of the electrode assembly 5. The negative electrode terminal 3 is electrically connected to the negative electrode of the electrode assembly 5 via the lead plate 9 and negative electrode lead 3c. Within the battery case 2, an insulating plate 6 is positioned between the negative electrode terminal 3 and electrode assembly 5. The insulating plate 6 prevents a short circuit between the negative electrode terminal 3 and electrode assembly 5. Although not shown, a positive electrode lead is connected to the positive electrode of the electrode assembly 5. The positive electrode lead is also connected to the cap 1. That is, the positive electrode of the electrode assembly 5 is electrically connected to the cap 1 and battery case 2 via the positive electrode lead.

When the negative electrode terminal 3 and packing member 8, extending through the terminal hole 13, are swaged, the packing member 8 tries to escape toward the outside of the terminal hole 13. The terminal hole 13 is located between a pair of projections 11a of the recess 11 of the cap 1 as determined along the lateral direction. Thus, the projections 11a prevent the packing member 8 from escaping toward the outside of the terminal hole 13 during swaging. This will make it possible to position the swaged packing member 8 so as to fill the gap between the terminal hole 13 and negative electrode terminal 3 while preventing the member from escaping toward the outside of the terminal hole 13.

Thus, the projection 11a of the recess 11 is in contact with the packing member 8. Since the packing member 8 is pressed by the projection 11a, the packing member 8 is prevented from contacting large portions of the edges of the recess 11a. This prevents heat release from the cap 1 from welding. That is, the projection 11a of the recess 11 improves the airtightness of the cap 1 and prevents heat release from welding. For example, the packing member 8 may be positioned so as to be in contact with the recess 11a of the recess 11 and not in contact with the recess portions 11b (see FIG. 3) which are adjacent to the projection 11a. In such implementations, spaces are present on the recess portions 11b adjacent to the projection 11a to prevent heat in the cap 1 for welding from being transmitted to central portions of the cap 1.

Part of the projection 11a of the recess 11 may be positioned to overlap the terminal hole 13 as determined along the longitudinal direction. Further, although the recess 11 in the implementation shown in FIG. 3 includes a pair of projections 11a, the recess 11 may include two or more pairs of projections 11a. In such implementations, part of the projections 11a in the two or more pairs may be positioned to overlap the terminal hole 13 as determined along the longitudinal direction. For example, a plurality of projections 11a may be provided such that the edges of the recess 11 are jagged as viewed in the direction perpendicular to the cap 1.

Manufacture Method of Battery

A method of manufacturing the battery 10 will now be outlined. The manufacture of the battery 10 is not limited to the exemplary method described in connection with the present embodiment.

First, an electrode assembly 5 is formed. For fabrication of an electrode assembly 5, a positive electrode, a negative electrode and a separator are prepared, each being band-shaped.

The positive electrode includes a positive-electrode current collector and a cathode mixture. The positive-electrode current collector is formed from, for example, foil of aluminum, titanium or the like, plain-woven metal wire, expanded metal, steel netting or perforated metal. A layer of the cathode mixture is formed on each side of the positive-electrode current collector. The cathode mixture is made by mixing together a positive-electrode active material, a conductive aid and a binder. The positive-electrode active material may be, for example, lithium manganate, a lithium-nickel composite oxide, a lithium-cobalt composite oxide, a lithium-nickel-cobalt composite oxide, vanadium oxide, or molybdenum oxide. The conductive aid may be, for example, graphite, carbon black, or acetylene black. The binder may be, for example, polyimide, polyamide-imide, polytetrafluoroethylene (PTFE), or polyvinylidene fluoride (PVDF), or a mixture thereof.

The negative electrode includes a negative-electrode current collector and an anode mixture. The negative-electrode current collector may be, for example, foil of copper, nickel or stainless steel, plain-woven metal wire, expanded metal, steel netting or perforated metal. A layer of the anode mixture is formed on each side of the negative-electrode current collector. The anode mixture is made by mixing together a negative-electrode active material and a binder. The negative-electrode active material may be, for example, natural graphite, mesophase carbon or amorphous carbon. The binder may be, for example, a cellulose such as carboxymethyl cellulose (CMC) or hydroxypropyl-cellulose (HPC), a rubber binder such as styrene-butadiene rubber (SBR) or acrylic rubber, PTFE or PVDF, or a mixture thereof.

The separator may be formed from porous film or non-woven fabric of, for example, polypropylene (PP), polyethylene (PE), polyethylene-terephthalate (PET), polybutylene terephthalate (PBT) or polyphenylene sulfide (PPS).

A negative electrode, a separator, a positive electrode and a separator are deposited in this order to fabricate an intermediate product. The fabricated intermediate product is wound and pressed to achieve a flat shape. This provides a spiral electrode assembly 5. A positive electrode lead and a negative electrode lead 3c protrude from one of the ends of the electrode assembly 5 as determined along the winding-axis direction of the assembly (i.e. upper surface).

The battery case 2 may be formed by deep-drawing an aluminum alloy plate, for example. The electrode assembly 5 is inserted into the battery case 2, as shown in FIG. 2.

The battery case 2 and cap 1 are not limited to particular materials, and may be formed from a metal such as an aluminum alloy, for example. The battery case 2 may be formed by deep-drawing a metal plate of, for example, an aluminum alloy. The cap 1 may be formed, for example, by forging a metal plate of an aluminum alloy, for example. A recess 11 and a groove 12 in the cap 1 may be formed by coining, for example.

The cap 1, insulating member 7 and lead plate 9 are stacked, and the negative electrode terminal 3 and packing member 8 are inserted therethrough. The tip of the negative electrode terminal 3 is swaged to be crimped onto the lead plate 9. Thus, the packing member 8 is embedded between the terminal hole 13 in the cap 1 and the negative electrode terminal 3 without leaving a gap.

The negative electrode lead 3c and positive electrode lead that have been drawn out of the electrode assembly 5 are made to pass through the insulating plate 6; then, the negative electrode lead 3c is connected to the lead plate 9 and the positive electrode lead is connected to the cap 1. The electrode assembly 5 is inserted into the battery case 2 and the cap 1 is press-fit into the opening of the battery case 2. A laser beam is directed to the border between the outer periphery of the cap 1 and the opening of the battery case 2 to weld the outer periphery of the cap 1 to the opening of the battery case 2. For example, the position to which a laser beam is directed is moved along the entire outer periphery of the cap 1. This results in the entire outer periphery of the cap 1 being welded to the battery case 2. This achieves uniform welding conditions along the entire outer periphery of the cap 1. That is, a uniform amount of laser beam energy is directed to the entire outer periphery of the cap 1. The welding conditions are regulated by adjusting weld rate, the frequency or laser power of the laser beam, laser-spot diameter, etc. In this way, the cap 1 is joined to the opening of the battery case 2. Thus, the opening of the battery case 2 is sealed by the cap 1.

Thereafter, electrolyte (not shown) is injected into the battery case 2 through the fill port 14. The electrolyte is a solution in which a lithium salt is dissolved in an organic solvent. The organic solvent may be, for example, vinylene carbonate (VC), propylene carbonate (PC), ethylene carbonate (EC), butylene carbonate (BC), dimethyl carbonate (DMC), diethyl carbonate (DEC), methylethyl carbonate (MEC) or γ-butyrolactone, or a mixture of two or more of these compounds. The lithium salt may be, for example, $LiPF_6$, $LiBF_4$ or $LiN(CF_3SO_2)_2$.

After the electrolyte (not shown) has been injected into the battery case 2, the fill port 14 is sealed by a seal plug 4. The seal plug 4 may be joined to the outer peripheral edge of the fill port 14 in the cap 1 by welding, for example. This results in a battery 10.

Although an embodiment has been described, the present invention is not limited to the above-illustrated embodiment, and various modifications are possible without departing from the spirit of the invention. For example, the recess 11 is not limited to a geometry including a projection 11a, as in the above-illustrated implementation. The recess 11 may include no projection 11a. In the above-illustrated implementation, an edge of the recess 11, between ends of two grooves 12 adjacent in the longitudinal direction, has two locations with the minimum distance from the outer periphery 1a; alternatively, such an edge may have only one such location.

Further, in the implementation shown in FIG. 2, the grooves 12 are not present in the regions that overlap the fill port 14 as determined along the longitudinal direction. Alternatively, the grooves 12 may be present in the regions overlapping the fill port 14 as determined along the longitudinal direction. For example, the grooves 12 may continually extend along all the portions of the outer periphery of the cap 1 other than the portions associated with the recess 11.

In the above-illustrated implementation, the recess 11 and grooves 12 are spaced apart from each other. This facilitates forging of the cap 1. Alternatively, the recess 11 and grooves 12 may be connected.

The above implementation describes, as an example, a battery 10 in which the battery case 2 and cap 1 are charged to form the positive electrode; alternatively, a battery in which the battery case and cap may be charged to form the negative electrode. In such implementations, the terminal that extends through the terminal hole is the positive electrode terminal, i.e. the pole opposite to that formed by the case and cap.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A cap for a battery case,
the cap adapted to close an opening of a battery case for containing an electrode assembly,
the cap being formed by an elongated plate extending in a longitudinal direction,
the cap including:
a terminal hole adapted to allow a positive electrode terminal or a negative electrode terminal of the electrode assembly to pass therethrough; and
a recess formed in an outer surface of the cap, the outer surface representing an exterior of the battery, the recess located in a region that surrounds the terminal hole and that is not in contact with an outer periphery of the outer surface,
wherein an edge of the recess includes a projection protruding inwardly from the edge along only a partial circumferential length of the edge as viewed from a direction perpendicular to the outer surface, and
the projection is positioned adjacent the terminal hole in a direction perpendicular to the longitudinal direction.

2. The cap for a battery case according to claim 1, further including a groove located in a region that does not overlap the recess as determined along the longitudinal direction of the cap, the groove being spaced apart from the outer periphery and extending along the outer periphery.

3. The cap for a battery case according to claim 1, wherein the cap includes a fill port, and the groove is located in a region that does not overlap the fill port as determined along the longitudinal direction.

4. The cap for a battery case according to claim 2, wherein an end of the groove is spaced apart from the recess.

5. The cap for a battery case according to claim 2, wherein the projection of the recess overlaps at least part of the groove as viewed in the longitudinal direction.

6. A battery comprising:
an electrode assembly having a positive electrode, a negative electrode, and a separator positioned between the positive electrode and the negative electrode;
a battery case having a flat cylindrical side wall adapted to contain the electrode assembly and a bottom adapted to seal one of ends of the side wall as determined along an axial direction of the side wall;
a cap adapted to close an opening of the side wall, the opening located on an end of the side wall opposite to the end associated with the bottom, the cap including a terminal hole adapted to allow the positive electrode terminal or the negative electrode terminal of the electrode assembly to pass therethrough; and
a packing member adapted to fill a gap between the positive or negative electrode terminal passing through the terminal hole and the terminal hole,
wherein the cap is formed by an elongated plate extending in a longitudinal direction,
the cap includes a recess formed in an outer surface of the cap, the outer surface representing an exterior of the battery, the recess located in a region that surrounds the terminal hole and that is not in contact with an outer periphery of the outer surface,
an edge of the recess includes a projection protruding inwardly from the edge along only a partial circumferential length of the edge as viewed from a direction perpendicular to the outer surface, and
the projection is positioned adjacent the terminal hole in a direction perpendicular to the longitudinal direction.

* * * * *